United States Patent
Springer et al.

(10) Patent No.: US 8,305,887 B2
(45) Date of Patent: Nov. 6, 2012

(54) SELECTIVE DEFRAGMENTATION OF QUADRATURE AMPLITUDE MODULATORS

(75) Inventors: Gary M. Springer, Alpharetta, GA (US); Luis A. Rovira, Atlanta, GA (US)

(73) Assignee: Cisco Technology, Inc., San Jose, CA (US)

( * ) Notice: Subject to any disclaimer, the term of this patent is extended or adjusted under 35 U.S.C. 154(b) by 169 days.

(21) Appl. No.: 12/565,967

(22) Filed: Sep. 24, 2009

(65) Prior Publication Data

US 2011/0072474 A1 Mar. 24, 2011

(51) Int. Cl.
 *H04L 12/28* (2006.01)
 *H04J 3/16* (2006.01)
 *H04N 7/12* (2006.01)

(52) U.S. Cl. ..... 370/229; 370/431; 370/468; 348/390.1; 348/433.1

(58) Field of Classification Search .......... 370/229–231, 370/252, 329, 431, 432, 463, 468; 348/384.1, 348/388.1, 390.1, 426.1, 433.1
See application file for complete search history.

(56) References Cited

U.S. PATENT DOCUMENTS

| | | | | |
|---|---|---|---|---|
| 6,801,543 B1 * | 10/2004 | Ployer | | 370/468 |
| 7,630,401 B2 * | 12/2009 | Iwamura | | 370/468 |
| 7,751,451 B2 * | 7/2010 | Honhart | | 370/535 |
| 8,112,781 B2 * | 2/2012 | Schlack | | 370/468 |
| 2004/0022267 A1 * | 2/2004 | Birru | | 370/468 |
| 2004/0163129 A1 | 8/2004 | Chapman et al. | | |
| 2007/0223422 A1 * | 9/2007 | Kim et al. | | 370/334 |
| 2008/0181252 A1 * | 7/2008 | Rofougaran | | 370/451 |
| 2009/0116439 A1 * | 5/2009 | Madan et al. | | 370/329 |
| 2010/0042886 A1 * | 2/2010 | Kim et al. | | 714/748 |
| 2010/0254296 A1 * | 10/2010 | Gould | | 370/312 |
| 2010/0316104 A1 | 12/2010 | Chapman et al. | | |
| 2011/0128961 A1 * | 6/2011 | Brooks et al. | | 370/392 |

* cited by examiner

*Primary Examiner* — Kerri Rose
(74) *Attorney, Agent, or Firm* — Edell, Shapiro & Finnan, LLC

(57) ABSTRACT

Techniques are provide herein to determine the amount of allocated and unutilized bandwidth for services already provided on each of a plurality of quadrature amplitude modulator (QAM) channels. One of the plurality of QAM channels is selected as a selected QAM channel to maximize capacity for future service requests based on a determination that the selected QAM channel can have bandwidth deallocated to support a service at a second bandwidth greater than a first bandwidth. A sufficient amount of the allocated and unutilized bandwidth is deallocated for services provided at the first bandwidth on the selected QAM channel such that the service at the second bandwidth is thereafter supportable on the selected QAM.

18 Claims, 7 Drawing Sheets

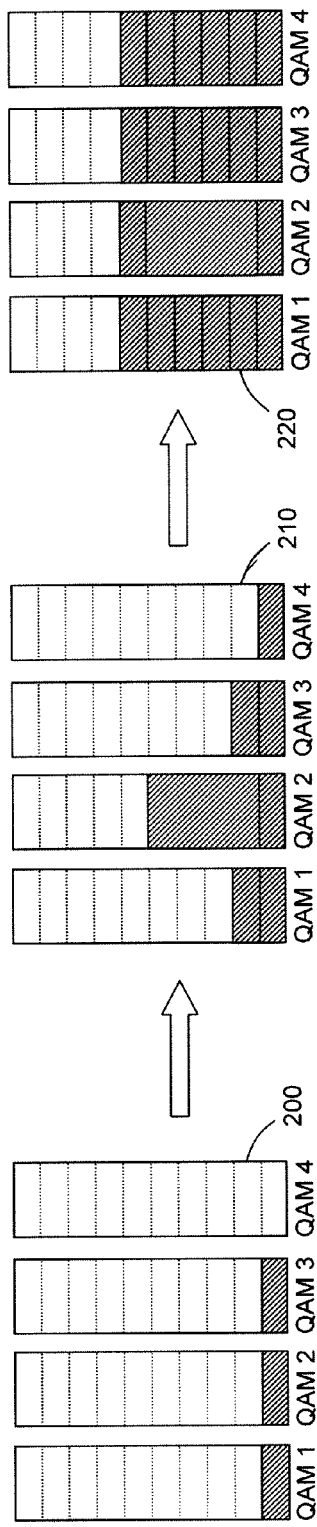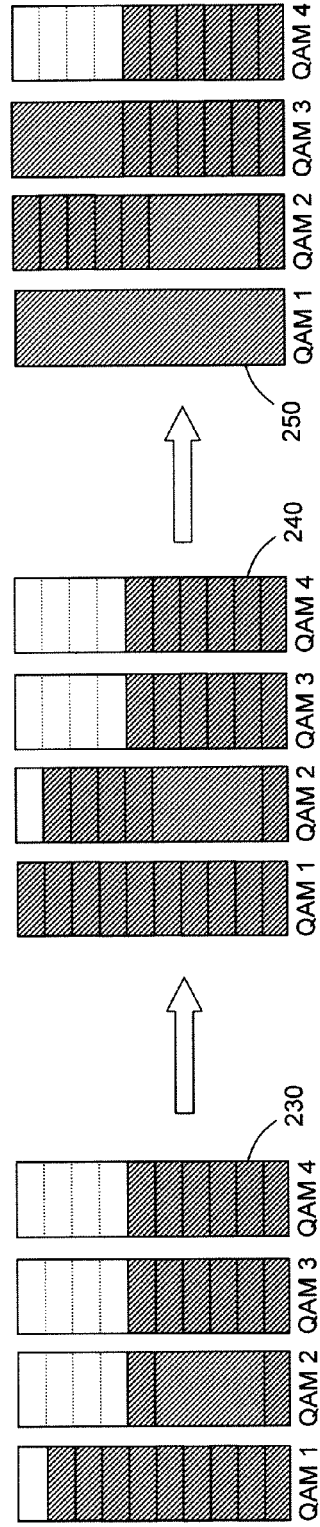

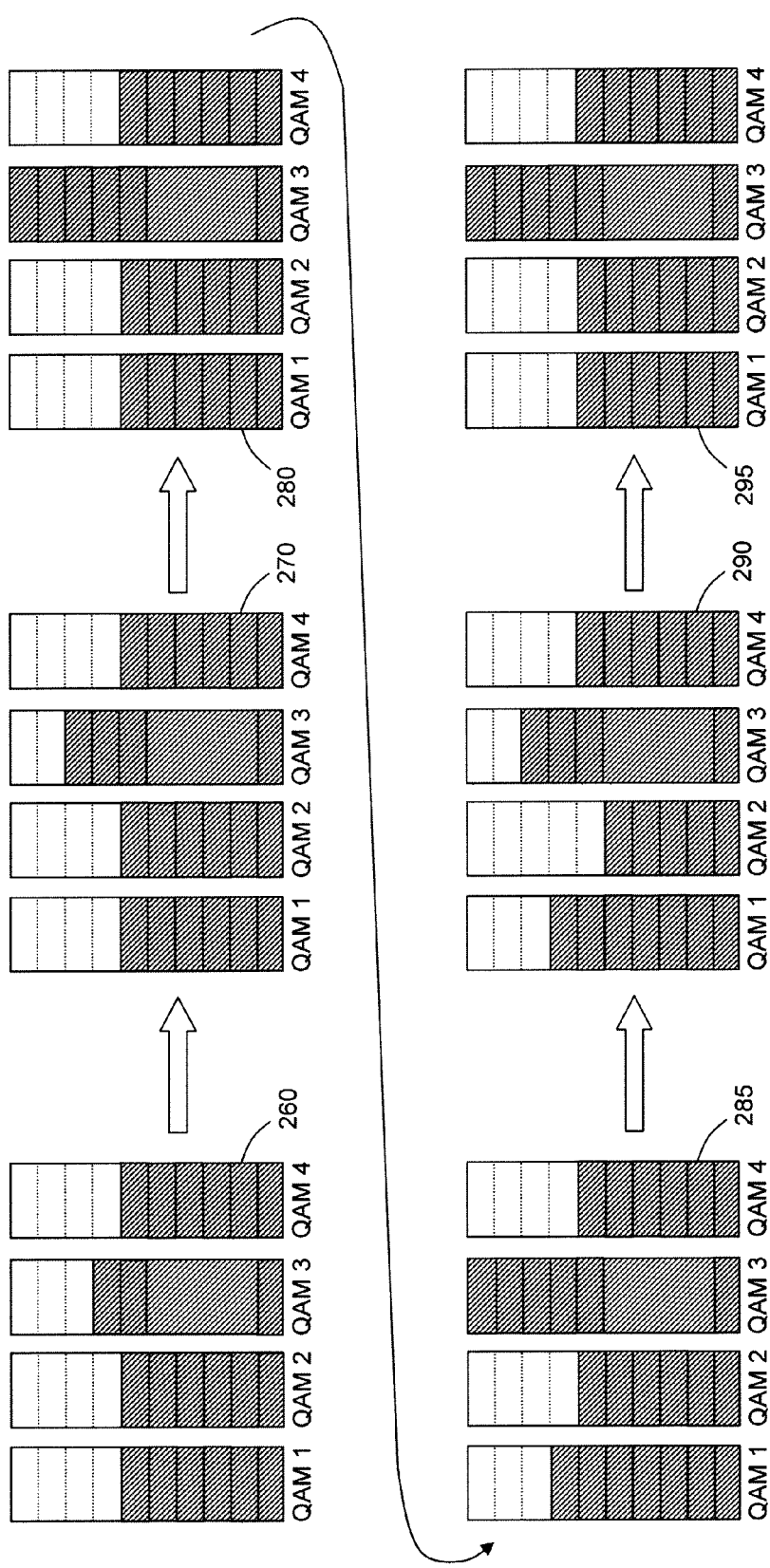

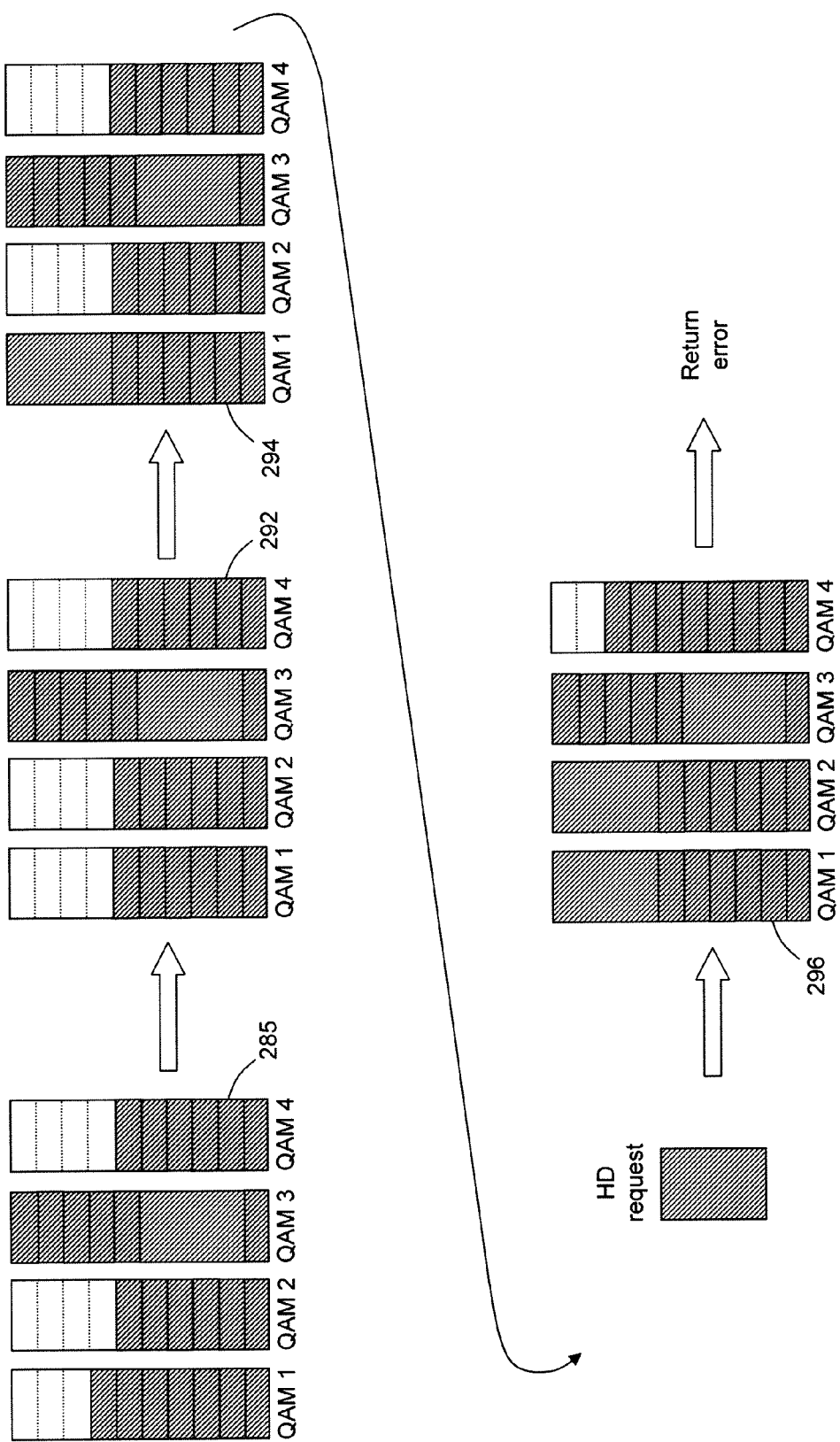

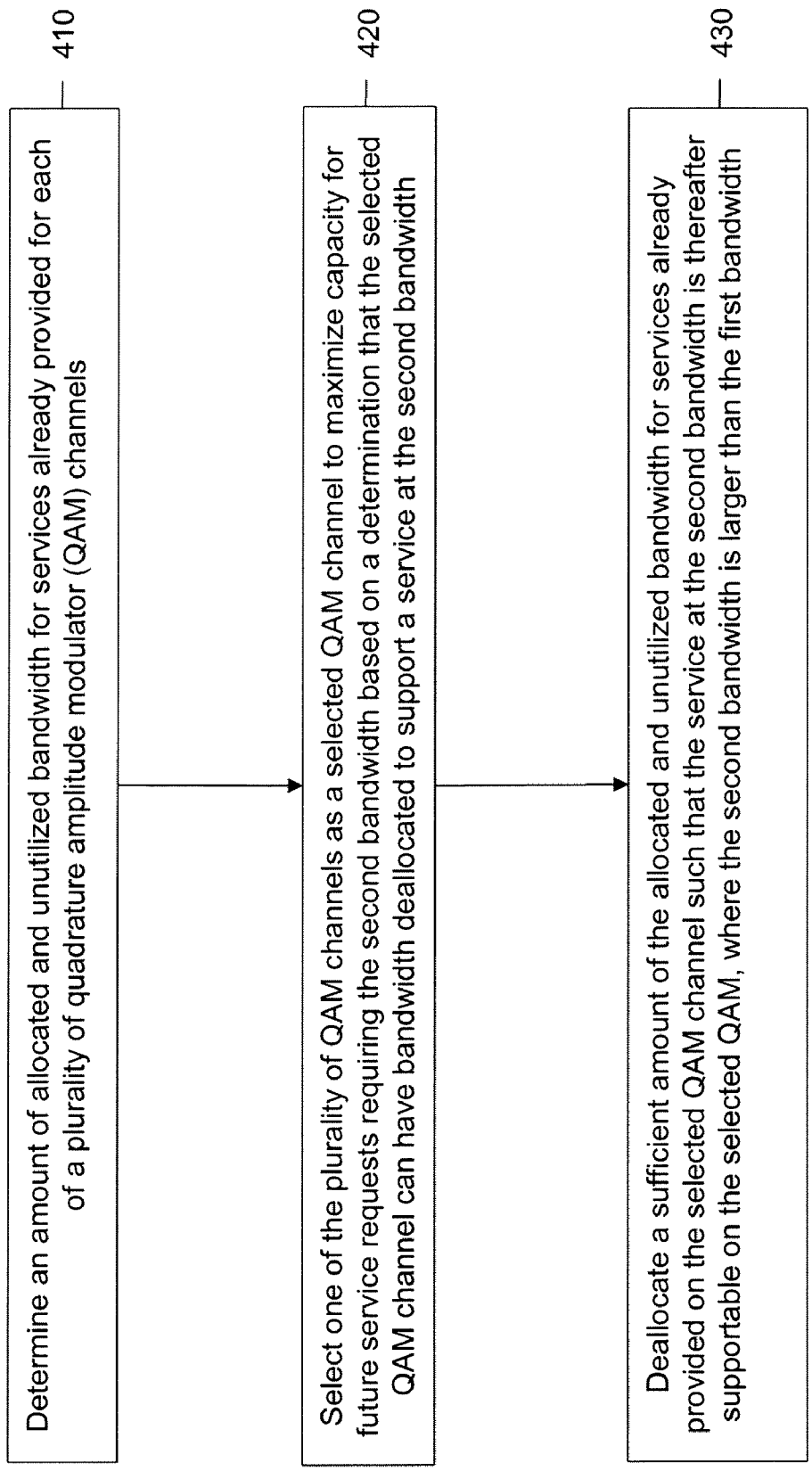

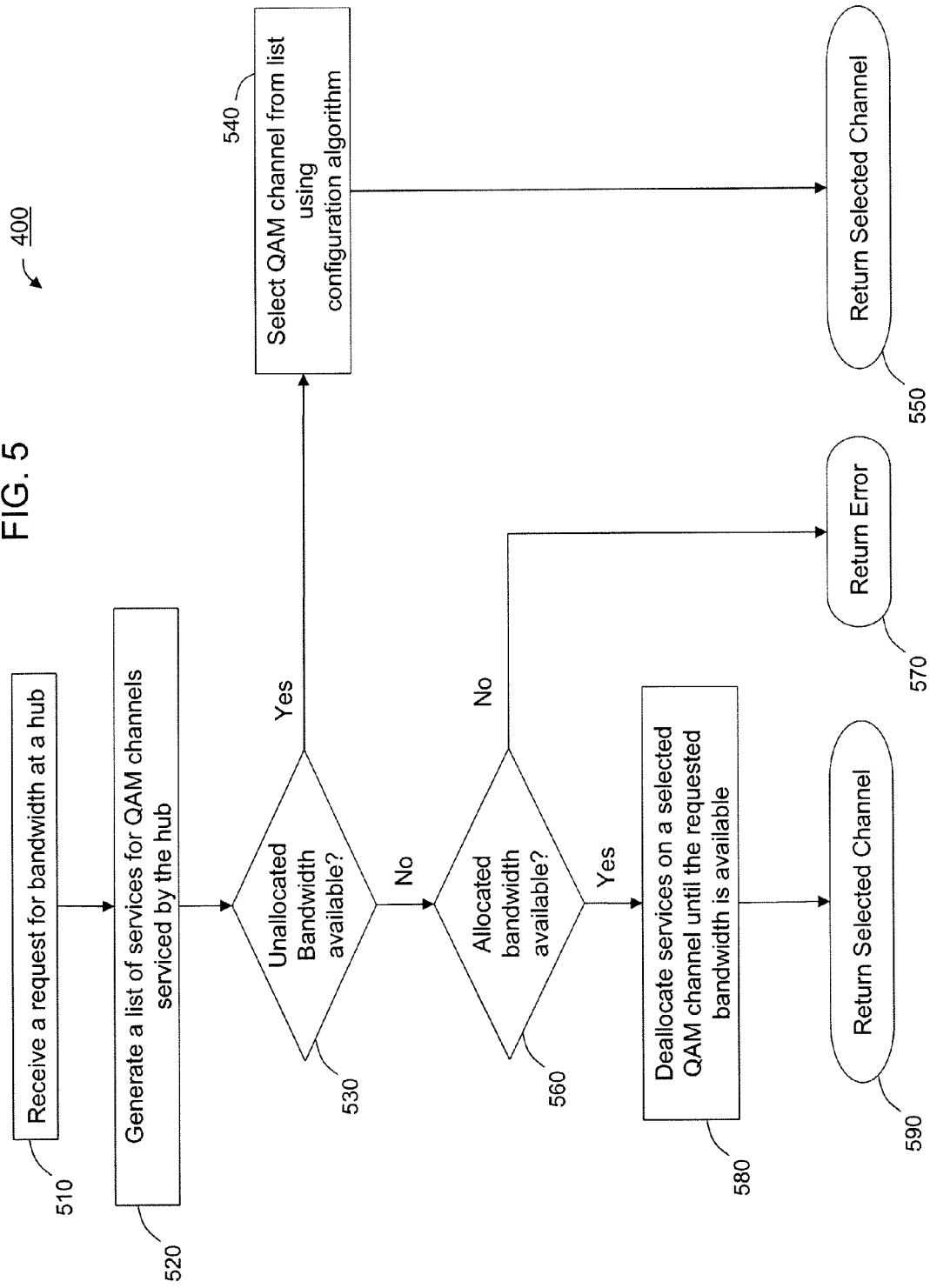

SELECTIVE DEFRAGMENTATION OF QUADRATURE AMPLITUDE MODULATORS

TECHNICAL FIELD

The present disclosure relates generally to switched digital video (SDV), and more specifically to bandwidth management for quadrature amplitude modulators (QAMs).

BACKGROUND

Digital video can be delivered in a broadcast mode, a switched mode, or in an on-demand mode. In broadcast mode, all channels are broadcasted from a source (e.g., a cable television system hub) to all the subscribers connected to that hub (e.g., a service group). Broadcast delivery broadcasts all channels all the time, even when a channel has no active viewers. As the number of channels being broadcast increases, bandwidth demands placed on the cable television system also increase. On-demand delivery occupies bandwidth only while the viewer demands the video, and is a type of unicast delivery (i.e., to a single destination) of video assets. Switched digital video (SDV) offers improved bandwidth utilization by delivering channels with active viewers. SDV can be either switched unicast or switched multicast (i.e., any subscriber can access the channel being broadcast). Switched multicast provides the best bandwidth efficiency by not duplicating channels, while switched unicast offers the ability to personalize content.

In a traditional SDV environment (Motion Picture Experts Group (MPEG) video delivery), there are several major components: a switched digital video server; an edge QAM; a video source; and a set top box (STB) switched client. When a user selects a channel, the set top box "switched client" signals the SDV session manager of the selected channel and the service group that the set top box belongs to. If the channel is already being delivered to the service group, the SDV session manager simply returns the tuning information to the STB switched client. Otherwise, the switched digital video server will instruct the edge QAM to deliver the selected channel to the service group. The edge QAM then joins the multicast video source and delivers the video to the service group.

BRIEF DESCRIPTION OF THE DRAWINGS

The features and advantages of selective defragmentation of QAMs of the present disclosure will become apparent upon consideration of the following description of example embodiments thereof, particularly when taken in conjunction with the accompanying drawings wherein like reference numerals in the various figures are utilized to designate like components.

FIGS. 2a-d are sequence diagrams depicting bandwidth management using selective defragmentation of QAMs in accordance with an embodiment.

FIG. 4 is an example procedural flowchart illustrating the manner in which QAMs are selectively defragmented in accordance with a first embodiment.

FIG. 5 is an example procedural flowchart illustrating the manner in which QAMs are selectively defragmented in accordance with a second embodiment.

DESCRIPTION OF EXAMPLE EMBODIMENTS

Overview

Techniques are provide herein to determine the amount of allocated and unutilized bandwidth for services provided at first and second bandwidths on each of a plurality of quadrature amplitude modulator (QAM) channels. One of the plurality of QAM channels is selected as a selected QAM channel to maximize or increase capacity for future service requests requiring the second bandwidth based on a determination that the selected QAM channel can have bandwidth deallocated to support a service at the second bandwidth. A sufficient amount of the allocated and unutilized bandwidth is thereafter deallocated for services already provided on the selected QAM channel such that the service at the second bandwidth is supportable on the selected QAM. The second bandwidth is larger than the first bandwidth.

Example Embodiments

Figure 1:
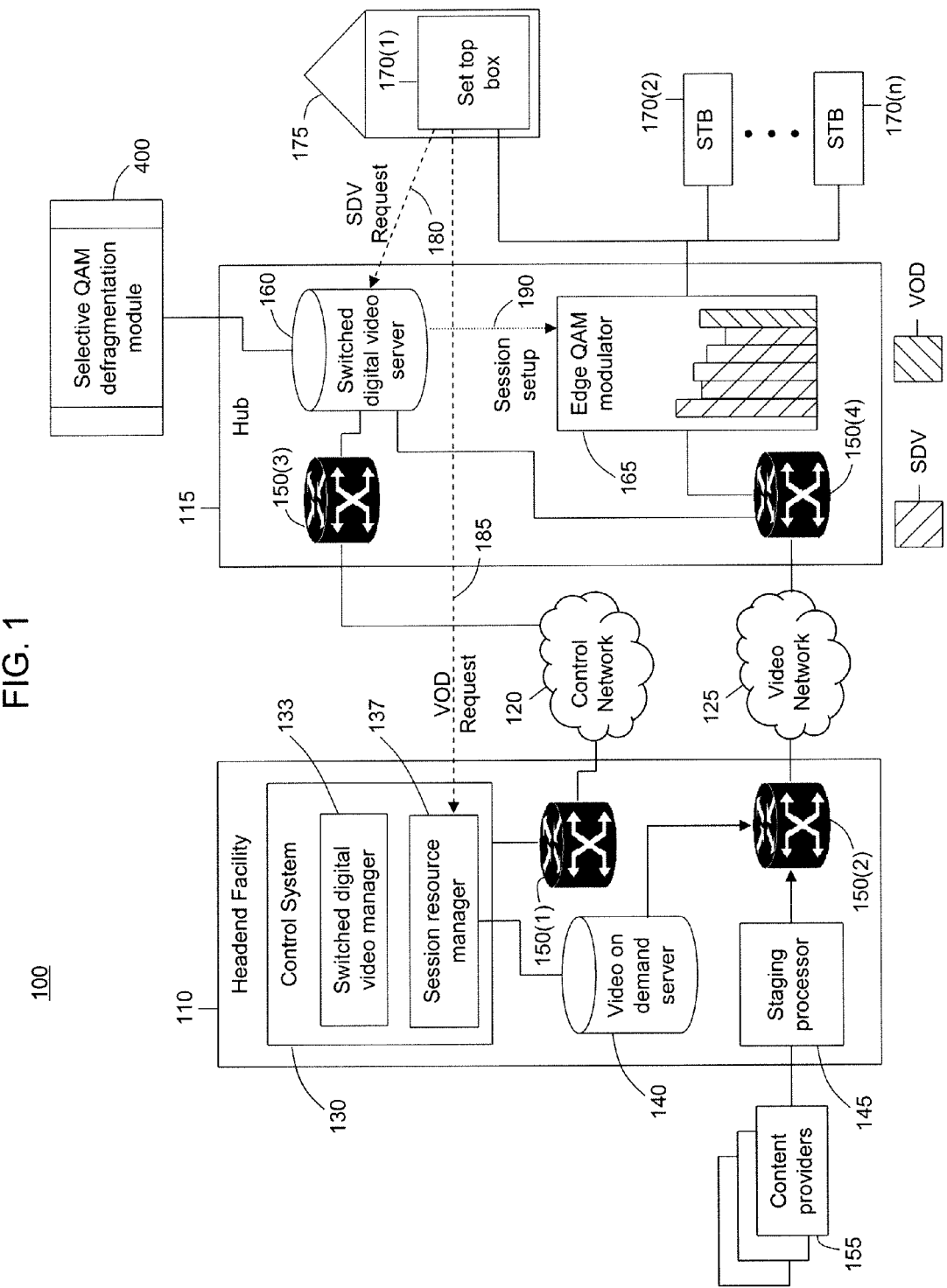
FIG. 1 is a block diagram of an example video distribution system employing selective defragmentation of QAMs in accordance with an embodiment.

Referring to FIG. 1, an example video distribution system or network 100 employing selective QAM defragmentation module 400 in accordance with an embodiment is shown. Specifically, the system 100 includes a headend facility (HEF) 110, a control network 120, a video distribution network 125, a hub 115, and a plurality a set top boxes (STBs) 170(1)-170(n) with STB 170(1) residing in a customer premise 175. The system 100 may contain a plurality of other hubs which are not shown for simplicity. The plurality of STBs 170(1)-170(n) serviced by a hub, e.g., the hub 115, is commonly referred to as a service group. The customer premise 175 may also house other components (not shown), e.g., splitters and cable modems.

The HEF 110 is connected to various content providers 155 and contains a video on demand (VOD) server 140 for providing media content (e.g., movies, television channels, etc.). The media content is distributed by HEF 110 to the hub 115 via network 125 (e.g., a synchronous optical network (SONET), synchronous digital hierarchy (SDH) network, or Internet protocol (IP) network), and routers 150(2) and 150(4). The content is further distributed by hub 115 to a plurality of STBs 170 in the form of switched digital video or video on demand (VOD). Descriptions are made herein with respect to a preferred embodiment using STBs, however, any suitable computing device, e.g., a personal computer (PC) may be configured to communicate with and receive services from the various components in system 100.

Media content received from the content providers 155 may be further processed by staging processor 145. The staging processor 145 may perform several functions including signal conditioning, aggregating multiple MPEG sources, converting multi-program transport streams (MPTS) into IP multicast or IP unicast single-program transport streams (SPTS) for transmission over video network 125, converting variable bit rate content to constant bit rate content in order to manage stream bandwidth, encrypting, and encapsulating MPEG into IP or gigabit Ethernet.

The HEF 110 contains a control system 130 comprising a SDV manager 133 and a session resource manager (SRM) 137. The SDV manager 133 may provide a user interface to the control system 130, and provides a means for multi system/service operators (MSOs) to configure service group assignments and SDV server settings, e.g., using Simple Network Management Protocol (SNMP). The SRM 137 governs access to content and network resources including SDV and VOD. The control functions between control system 130 and hub 115 are communicated over control network 120 via routers 150(1) and 150(3). The HEF 110 may also contain other components (not shown), e.g., encryption devices and other networking components.

The hub 115 houses an SDV server 160 and edge QAM modulator 165. QAMs in the edge QAM modulator 165 may be single QAMs, with one modulator per chassis, or multi-QAMs with multiple modulators per chassis. Each QAM can typically modulate data at ~38.8 megabits per second (Mbps) over a 6 MHz band or 51 Mbps over an 8 MHz band that is known as a QAM channel. A standard definition (SD) program may use 3-6 Mbps of data bandwidth and a high definition (HD) program may use 15-22 Mbps of data bandwidth. Accordingly, a 6 MHz wide QAM channel with a 38.8 Mbps capacity can typically carry 9-10 SD programs, 1-2 HD programs, or 1 HD program and several SD programs, as will be described hereinafter.

The SDV server 160 generates information about SDV services currently provided by the MSO (e.g., the SDV programming lineup), IP addresses of primary and backup program servers, and initiates a program session setup 190 with edge QAM modulator 165 and binds program content thereto for transmission to the STBs by edge QAM modulator 165. Since in SDV content is dynamically changing based on MSO inputs and subscriber program requests, programming content is session based, i.e., the SDV server 160 initiates a session 190 with the edge QAM modulator 165 to set up a program on a particular QAM channel and terminates a session to deallocate or tear down a program on a particular QAM channel. The SDV server 160 monitors and reallocates bandwidth using selective QAM defragmentation module 400 in accordance with the present invention. Module 400 will be described generally in conjunction with FIGS. 2 and 3, and described in greater detail in conjunction with FIGS. 4 and 5. In general, module 400 acts to preserve bandwidth across the QAMs in the edge QAM modulator 165 in order to maximize or otherwise increase a number of available HD program slots, i.e., in the event HD SDV or HD VOD programs are requested from subscribers in the service group.

The SDV server 160 also provides information that contains tuning information for allocated SDV programs, e.g., an electronic program guide (EPG) or other file is provided to edge router 150(4). The EPG may then be sent to the STBs 170(1)-170(n) using in-band or out-of-band signaling. The SDV server 160 monitors channel changes by the STBs and may collect various usage statistics. Allocated SDV programs are programs that are currently being streamed by the edge QAM modulator 165 to the service group. Allocated SDV programs may or may not have viewers. Allocated SDV programs without viewers may be de-allocated to free up bandwidth or transferred to another QAM channel, while allocated programs with viewers cannot be moved to another QAM channel without causing a service disruption. Unallocated SDV programs are programs that are available to the service group, but are not currently being modulated by QAMs in the edge QAM modulator 165.

By way of example, when a user or subscriber in customer premise 175 requests an SDV program an SDV client in STB 170(1) sends SDV request 180. The SDV request 180 is sent to the SDV server 160 using out-of-band or in-band signaling. If the request is for an allocated program, the STB 170(1) can switch program channels immediately using the tuning information that was previously provided by the SDV server 160, i.e., the STB 170(1) can make a "quick channel change." If the request is for an unallocated program, then the SDV server 160 initiates a session setup 190 in order to provision the requested SDV program on one of the QAMs channels in the edge QAM modulator 165, and relays the tuning information to the SDV client in the STB 170(1). Provisioning the requested SDV program on one of the QAM channels is performed according to the criteria embodied in module 400. In general, MSOs prefer quick channel changes and will generally always allocate the most popular programs, while reserving bandwidth for VOD programs, and SDV programs that are not so popular.

If the SDV request 180 is for an unallocated SDV program, then the SDV server 160 provides the IP multicast Internet Group Management Protocol (IGMP) address for the requested SDV program to an edge QAM modulator 165. The edge QAM modulator 165 sends an IGMP join request to the edge router 150(4). For example, a SDV program may be assigned a multicast IP address of M.X.Y.Z, where M is a multicast compliant byte, and X, Y, and Z ranges from 0 to 255. The IGMP request can be understood using a simplified notation in the form of (Source, Group) or (S, G), where the Source is the address of the device providing the SDV program and the Group is the multicast group IP address associated with the program. For redundancy, there may be more than one device providing the same program. When a subscriber tunes to the program service flow, edge resource manager in edge QAM modulator 165 sends an IGMP request of (S, M.X.Y.Z), to the router 150(4). Once the router 150(4) receives the (S, M.X.Y.Z) IGMP request, it streams the selected program to edge QAM modulator 165.

In another example, a subscriber in customer premise 175 requests a VOD program. The SDV client in STB 170(1) sends VOD request 185. The VOD request 185 is sent to the SRM 137 using out-of-band or in-band signaling. The SRM 137 authenticates the VOD request 185, and if valid, instructs the VOD server 140 to provide the requested VOD program as a unicast program service flow. The SRM 137 also coordinates with the SDV server 160 to allocate bandwidth for the VOD request 185. The SDV server 160 initiates the session setup 190 in order to provision the requested VOD program on one of the QAM channels in the edge QAM modulator 165, and relays the tuning information to the STB 170(1). The edge resource manager in edge QAM modulator 165 sends an IGMP join request as described above. Provisioning the requested VOD program on one of the QAM channels is performed according to the criteria embodied in module 400. It is to be understood that the various components depicted in FIG. 1 are not necessarily housed in HEF 110 or hub 115, e.g., VOD server 140 could be in hub 115 or SDV server 160 and edge QAM modulator 165 might reside in HEF 110.

Referring to FIGS. 2a-d, with continued reference to FIG. 1, sequence diagrams depicting bandwidth management using selective defragmentation of QAMs are shown. The QAM channels 1-4 are shown with 10 SD slots of about 3.75 Mbps each, as indicated by the dashed horizontal lines. Free or unallocated program slots are indicated by unfilled areas and allocated program slots are filled with hatching. The size of the hatched rectangles approximates the allocated bandwidth for the program or service, e.g., allocated HD slots are shown as larger rectangles occupying four slots for a total bandwidth of about 15 Mbps (4×3.75).

FIG. 2a depicts lightly loaded QAM channels 1-4. For ease of illustration, only four QAM channels are shown. At 200, QAM channels 1-4 are starting to modulate allocated SD programs. At, 210, as time goes on, QAM channels are allocated more programs with an HD program shown allocated for QAM channel 2. At 220, as more channel bandwidth is allocated, the SDV server 160 load balances across the QAM channels, while maintaining bandwidth for HD programs as shown.

FIG. 2b depicts QAM channels 1-4 with increasing amounts of allocated bandwidth. The SDV server 160 allocates new bandwidth according to a configuration algorithm that maximizes a number of HD programming slots from among the QAMs. At 230, the SDV server 160 allocates channel bandwidth only on QAM channel 1, while preserving HD slots on QAM channels 2-4. At 240, QAM channel 1 is full and the SDV server 160 now allocates channel bandwidth only on QAM channel 2, while preserving HD slots on QAM channels 3 and 4. At 250, QAM channels 1 and 2 are full and the SDV server 160 allocates channel bandwidth only on QAM channel 3, while preserving an HD slot on QAM channel 4.

FIG. 2c depicts QAM channels 1-4 after a period of time over which programs have been allocated and deallocated. As programs are deallocated, module 400 allocates and reallocates bandwidth in order to maximize the number of available HD program slots. At 260, QAM channels 1-4 are shown with moderate amounts of allocated bandwidth. Module 400 has kept HD slots available on QAM channels 1, 2, and 4. At 270, the SDV server 160 receives a request for an SD slot and allocates channel bandwidth on QAM channel 3 which has no HD bandwidth available, thus preserving the HD slots on QAM channels 1, 2, and 4. At 280, QAM channel 3 is full. At 285, the SDV server 160 receives another request for an SD slot and must use one of the HD slots available on QAM channels 1, 2, and 4. In this case the SDV server 160 allocates channel bandwidth on QAM channel 1. Future SD program requests would be placed on QAM channel 1 and HD requests may be placed on QAM channels 2 or 4. If an opportunity exists to deallocate or reallocate bandwidth module 400 would attempt to defragment QAM 1 in order to obtain or regain another HD slot. This embodiment will be described in conjunction with FIG. 2d. At 290, module 400 is able to deallocate an SD program from QAM channel 2. At 295, module 400 is able to reallocate an SD program from QAM channel 1 to QAM channel 2, thereby restoring an HD program slot on QAM channel 1.

FIG. 2d depicts QAM channels 1-4. At 285, QAM channels 1-4 from FIG. 2c are depicted. In this example, the SDV server 160 receives a request for an HD slot. At 292, module 400 has determined according to the configuration algorithm that QAM channel 1 may be selected for program or service deallocation of one SD slot in order to obtain an HD slot, and module 400 deallocates the SD slot as shown. At 294, the SDV server 160 allocates and provisions the requested HD program slot on QAM channel 1. At 296, after additional programs have been allocated (one HD program and two SD programs), the SDV server 160 receives an additional request for HD bandwidth from one of the STBs 170(1)-170(n). Assuming bandwidth cannot be deallocated, there is not enough bandwidth available on any of the QAM channels 1-4 for an HD slot. In this case, the SDV server 160 returns an error to the requesting STB and informs the SRM 137.

Figure 3:
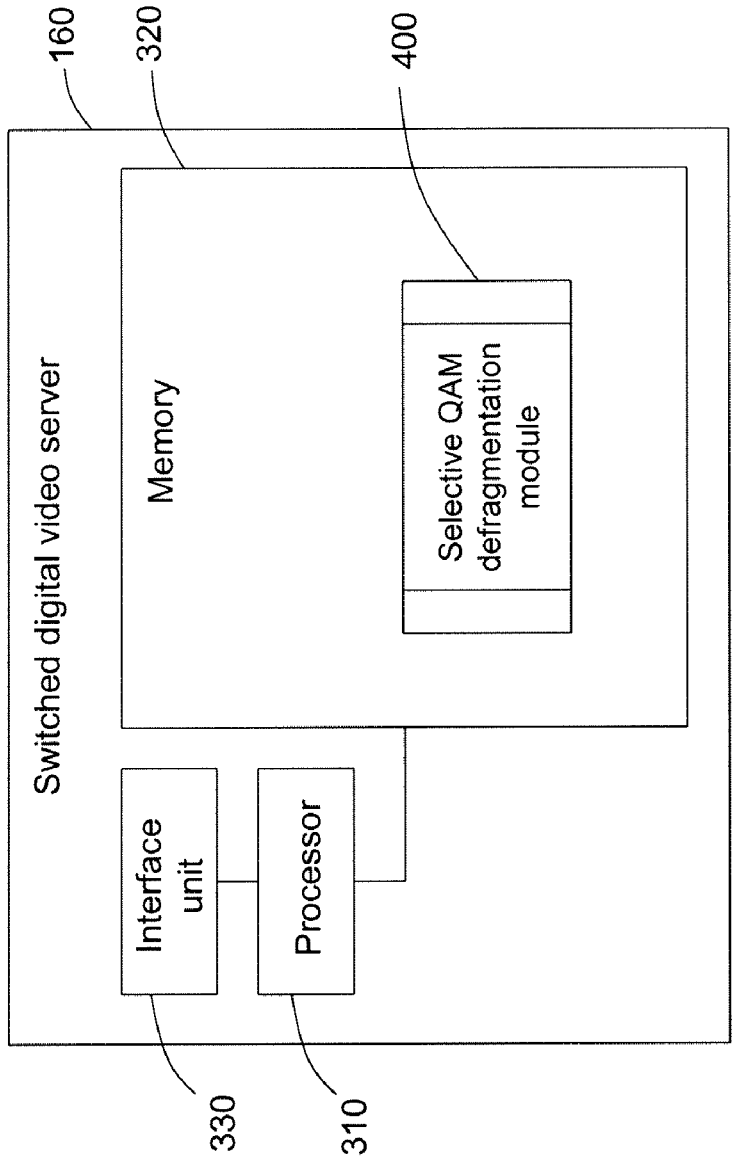
FIG. 3 is a block diagram of an SDV server that is configured to perform selective defragmentation of QAMs in accordance with an embodiment

Turning now to FIG. 3, a block diagram of an SDV server, e.g., SDV server 160, which is configured to perform selective defragmentation of QAMs is depicted. The SDV server 160 comprises a data processing device 310, an interface unit 330, and a memory 320. Resident in the memory 320 is software configured to execute selective QAM defragmentation module 400. The SDV server 160 and module 400 may also be implemented entirely in software and executed on available commercial off-the-shelf computing equipment.

The data processing device 310 may be a microprocessor, microcontroller, systems on a chip (SOCs), or other fixed or programmable logic. The memory 320 may be any form of random access memory (RAM) or other data storage block that stores data used for the techniques described herein. The memory 320 may be separate or part of the processor 310. Instructions for performing the module 400 may be stored in the memory 320 for execution by the processor 310. The interface unit 330 enables communication between the SDV server 160 and the various components, devices, and network elements shown in FIG. 1, and ultimately to other network elements in the system 100.

The functions of the processor 310 may be implemented by a processor readable tangible medium encoded with instructions or by logic encoded in one or more tangible media (e.g., embedded logic such as an application specific integrated circuit (ASIC), digital signal processor (DSP) instructions, software that is executed by a processor, etc.), wherein the memory 320 stores data used for the computations or functions described herein (and/or to store software or processor instructions that are executed to carry out the computations or functions described herein). Thus, the module 400 may be implemented with fixed logic or programmable logic (e.g., software or computer instructions executed by a processor or field programmable gate array (FPGA)).

Referring to FIG. 4, an example procedural flowchart illustrating the manner in which QAMs are selectively defragmented by module 400 according to a first embodiment will be described. At 410, an amount of allocated and unutilized bandwidth is determined for services already provided, for each of a plurality of quadrature amplitude modulator (QAM) channels. The services already provided may include a mix of a first bandwidth, for example SD bandwidth, and a larger second bandwidth, for example HD bandwidth, as shown at 285 in FIGS. 2c and 2d. At 420, one of the plurality of QAM channels is selected as a selected QAM channel to maximize or increasse capacity for future service requests requiring the second bandwidth based on a determination that the selected QAM channel can have bandwidth deallocated to support a service at the second band, e.g., HD bandwidth. At 430, a sufficient amount of the allocated and unutilized bandwidth is deallocated for services already provided on the selected QAM channel such that the service at the second bandwidth is thereafter supportable on the selected QAM. The second bandwidth is larger than the first bandwidth. In lieu of deallocating the unutilized bandwidth the SDV server may reallocate the unutilized bandwidth to another QAM channel. The SDV server may perform the functions of module 400 periodically, on a schedule or in response to other criteria, e.g., QAM channel loading. Module 400 may also be executed in response to a subscriber request for bandwidth or in anticipation of a request for bandwidth.

Referring to FIG. 5, an example procedural flowchart illustrating the manner in which QAMs are selectively defragmented by module 400 according to a second embodiment will be described. At 510, a request for an amount of bandwidth for a selected multimedia service provided via a network hub that is serving a given set of customers is received at a server device, e.g., an SDV server, where the server device manages bandwidth for quadrature amplitude modulator (QAM) channels in the hub. The requested bandwidth may be for SD or HD programs, or other services using QAM channel bandwidth. At 520, a list of services provided via the QAM channels currently serviced by the hub is generated, where the list contains allocated bandwidth information and unallocated bandwidth information for services provided via first and second bandwidths, and where the second bandwidth is larger than the first bandwidth. The list will generally contain the current program lineup being modulated by the edge QAM modulators, which programs are actively viewed (utilized), VOD programs, other services provided over the QAM channels, in-band signaling, and the bandwidths associated therewith.

At 530, it is determined whether an amount of unallocated bandwidth available for each of the QAM channels is greater than or equal to the requested bandwidth based on the list. At 540, if the amount of unallocated bandwidth on one or more QAM channels is greater than or equal to the requested bandwidth, then a QAM channel is selected according to a configuration algorithm designed to maximize or increase a number of available slots for services provided at the second bandwidth, and at 550 the selected QAM channel is returned. If the amount of unallocated bandwidth on all of the QAM channels is less than the requested amount of bandwidth then, at 560, an amount of allocated and unutilized bandwidth for each of the QAM channels is determined based on the list. If the amount of available allocated and unutilized bandwidth plus the amount of available unallocated bandwidth for one or more of the QAM channels is greater than the requested amount of bandwidth then steps 580 and 590 are performed. Each QAM channel that is not fully utilized may have unallocated bandwidth, allocated and unutilized bandwidth, and utilized bandwidth. The goal is to find an amount of unallocated bandwidth plus an amount of allocated and unutilized bandwidth (i.e., bandwidth that can be deallocated) that will accommodate the requested amount of bandwidth. If the module 400 cannot find enough bandwidth to accommodate the requested bandwidth, then at 570, the SDV server will return an error to the requesting STB and inform the SRM. Conversely, if an amount of unallocated bandwidth is available on any QAM channel, the SDV server can immediately bind the session and return tuning information to the STB.

At 580, a QAM channel is selected from the one or more QAM channels according to the configuration algorithm, where the configuration algorithm maximizes an amount of slots available at the second bandwidth from among the QAM channels, e.g., high definition video programming slots. The module 400 may also choose additional QAM channels to defragment to obtain available HD programming slots. Module 400 may also consider other MSO policies and priorities when selecting a QAM channel. Unutilized services are deallocated on the QAM channel until the requested amount of bandwidth is available on the QAM channel. The module 400 deallocates just enough bandwidth to allow the SDV server to bind the requested service, and then any additional bandwidth may continue to be deallocated or reallocated according to the configuration algorithm. At 590, the selected QAM channel is returned. The SDV server then allocates the requested bandwidth on the selected QAM channel and returns tuning information corresponding to the requested bandwidth to the requesting STB.

In additional embodiments, the module 400 may perform the defragmentation process periodically, or otherwise in anticipation of service requests in order to deallocate or reallocate resources. The module 400, generates the list of services, and deallocates or reallocates unutilized services on the QAM channels according to the configuration algorithm.

Techniques have been described herein to selectively defragment QAM channels. An amount of allocated and unutilized bandwidth is determined for services already provided at first and second bandwidths for each of a plurality of quadrature amplitude modulator (QAM) channels. One of the plurality of QAM channels is selected as a selected QAM channel to maximize capacity for future service requests requiring the second bandwidth based on a determination that the selected QAM channel can have bandwidth deallocated to support a service at the second bandwidth. A sufficient amount of the allocated and unutilized bandwidth is then deallocated for services already provided on the selected QAM channel such that the service at the second bandwidth is thereafter supportable on the selected QAM. The second bandwidth is larger than the first bandwidth.

Having described preferred embodiments of a new and improved selective defragmentation of QAMs, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method comprising:
   determining at a server device an amount of allocated and unutilized bandwidth for services already provided at first and second bandwidths on each of a plurality of quadrature amplitude modulator (QAM) channels of a QAM device in a cable television transmission system;
   selecting one of the plurality of QAM channels as a selected QAM channel to increase capacity for future service requests requiring the second bandwidth based on a determination that the selected QAM channel can have bandwidth deallocated to support a service at the second bandwidth; and
   deallocating a sufficient amount of the allocated and unutilized bandwidth for services already provided on the selected QAM channel such that the service at the second bandwidth is thereafter supportable on the selected QAM channel,
   wherein determining, selecting, and deallocating are performed when a request is received for an amount of bandwidth for the service provided at the second bandwidth, and wherein the second bandwidth corresponds to a high definition program bandwidth and the first bandwidth corresponds to a standard definition program bandwidth.

2. The method of claim 1, wherein the request for the amount of bandwidth is received periodically or in anticipation of a request for the service.

3. The method of claim 1, wherein services associated with deallocated bandwidth are reallocated to another QAM channel from among the plurality of QAM channels.

4. The method of claim 1, further comprising returning an error if deallocating the allocated and unutilized bandwidth from each of the plurality of QAM channels will not free up enough bandwidth to accommodate the requested amount of bandwidth.

5. The method of claim 1, further comprising allocating the requested bandwidth on the selected QAM channel.

6. The method of claim 5, further comprising returning tuning information corresponding to the requested bandwidth.

7. An apparatus comprising:
   an interface unit configured to enable communication over a network; and
   a processor configured to:
      determine an amount of allocated and unutilized bandwidth for services already provided at first and second bandwidths on each of a plurality of quadrature amplitude modulator (QAM) channels of a QAM device in a cable television transmission system;

select one of the plurality of QAM channels as a selected QAM channel to increase capacity for future service requests requiring the second bandwidth based on a determination that the selected QAM channel can have bandwidth deallocated to support a service at the second bandwidth; and deallocate a sufficient amount of the allocated and unutilized bandwidth for services already provided on the selected QAM channel such that the service at the second bandwidth is thereafter supportable on the selected QAM, wherein the processor is configured to determine, select, and deallocate when a request is received via the interface for an amount of bandwidth for the service provided at the second bandwidth, and wherein the second bandwidth corresponds to a high definition program bandwidth and the first bandwidth corresponds to a standard definition program bandwidth.

8. The apparatus of claim 7, wherein the processor is configured to periodically received the request for the amount of bandwidth, or in anticipation of receiving a request for the service.

9. The apparatus of claim 7, wherein the processor is configured to reallocate services associated with deallocated bandwidth to another QAM channel from among the plurality of QAM channels.

10. The apparatus of claim 7, wherein the processor is further configured to return an error when deallocating the allocated and unutilized bandwidth from each of the plurality of QAM channels will not free up enough bandwidth to accommodate the requested amount of bandwidth.

11. The apparatus of claim 7, wherein the processor is further configured to allocate the requested bandwidth on the selected QAM channel.

12. The apparatus of claim 11, wherein the processor is further configured to return tuning information corresponding to the requested bandwidth.

13. A processor readable tangible non-transitory medium encoded with instructions that, when executed by a processor, cause the processor to:

generate a list of services provided via quadrature amplitude modulator (QAM) channels of a QAM device in a cable television transmission system currently serviced by a video network hub serving a given set of customers, wherein the list contains allocated bandwidth information and unallocated bandwidth information for services provided via first and second bandwidths, wherein the allocated bandwidth information further contains unutilized services information, and wherein the second bandwidth corresponds to a high definition program bandwidth and the first bandwidth corresponds to a standard definition program bandwidth; and determine an amount of allocated and unutilized bandwidth for services already provided on each of the QAM channels based on the list, wherein if deallocating or reallocating a portion of the amount of allocated and unutilized bandwidth from a given QAM channel will free up enough bandwidth to create a slot for a service at the second bandwidth:

deallocate the portion of the amount of allocated and unutilized bandwidth from the given QAM channel, or reallocate the portion of the amount of allocated and unutilized bandwidth from the given QAM channel to another QAM channel.

14. The processor readable tangible non-transitory medium of claim 13, wherein the instructions that generate comprise instructions that cause the processor to generate the list of services periodically, or in anticipation of a request for the service; determine periodically, or in anticipation of a request for the service, an amount of allocated and unutilized bandwidth for services provided at the first bandwidth for each of the QAM channels based on the list; and deallocate periodically, or in anticipation of a request for the service, the portion of the amount of allocated and unutilized bandwidth from the given QAM channel.

15. The processor readable tangible non-transitory medium of claim 13, wherein the instructions that generate comprise instructions that cause the processor to generate periodically, or in anticipation of a request for the service, the list of services; determine periodically, or in anticipation of a request for the service, an amount of allocated and unutilized bandwidth for services provided at the first bandwidth for each of the QAM channels based on the list; and reallocate periodically, or in anticipation of a request for the service, the portion of the amount of allocated and unutilized bandwidth from the given QAM channel.

16. The processor readable tangible non-transitory medium of claim 13, further encoded with instructions that, when executed by a processor, allow the processor to receive a request for an amount of bandwidth for a service provided at the second bandwidth and to generate the list in response to receiving the request, wherein if unallocated bandwidth is not available on any of the QAM channels to accommodate the bandwidth request, then to determine an amount of allocated and unutilized bandwidth for services already provided on each of the QAM channels based on the list, wherein if deallocating or reallocating a portion of the amount of allocated and unutilized bandwidth from a given QAM channel will free up enough bandwidth to accommodate the requested amount of bandwidth, and further encoded with instructions that, when executed by a processor, cause the processor to:

deallocate the portion of the amount of allocated and unutilized bandwidth from the given QAM channel, or reallocate the portion of the amount of allocated and unutilized bandwidth from the given QAM channel to another QAM channel.

17. The processor readable tangible non-transitory medium of claim 16, further encoded with instructions that, when executed by a processor, cause the processor to return an error if deallocating or reallocating a portion of the amount of allocated and unutilized bandwidth from a given QAM channel will not free up enough bandwidth to accommodate the requested amount of bandwidth.

18. The processor readable tangible non-transitory medium of claim 16, further encoded with instructions that, when executed by a processor, cause the processor to:

allocate the requested bandwidth on the QAM channel when the requested amount of bandwidth is available on the QAM channel; and return tuning information corresponding to the requested bandwidth.

* * * * *